June 22, 1926.

A. N. SMITH 1,589,995

TIRE CHAIN TIGHTENING COUPLING

Filed Nov. 7, 1925

Inventor
A. N. Smith
By Clarence A. O'Brien
Attorney

Patented June 22, 1926.

1,589,995

UNITED STATES PATENT OFFICE.

ARCHIE N. SMITH, OF GRANGEVILLE, IDAHO.

TIRE-CHAIN-TIGHTENING COUPLING.

Application filed November 7, 1925. Serial No. 67,573.

My present invention pertains to tire chain coupling and tightening devices, and contemplates the provision of a device of the kind stated, characterized by simplicity and inexpensiveness in construction, by strength and durability, and by the facility with which its manipulation brings about the tightening of a tire chain and the secure holding of the said chain against casual loosening.

To the attainment of the foregoing, the invention consists in the improvement as hereinafter described and definitely claimed.

In the accompanying drawing forming part hereof:—

Similar numerals of reference designate corresponding parts in both views of the drawings.

Figure 1:
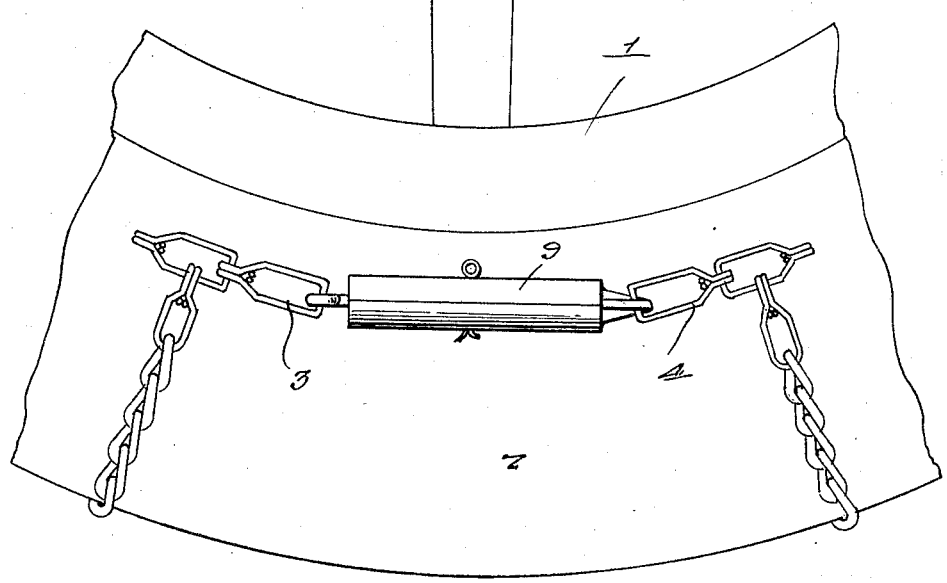
Figure 1 is a side elevation showing the preferred embodiment of my invention in use.
Figure 2:
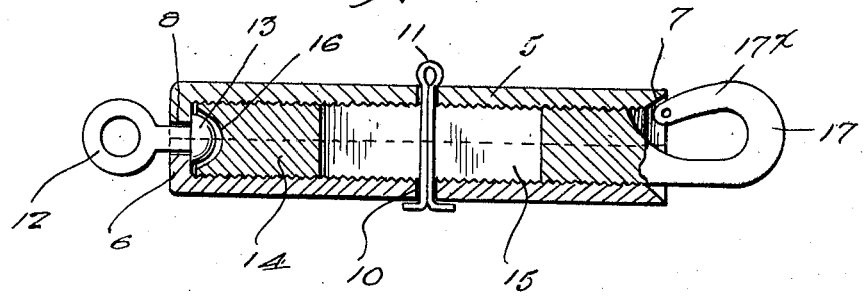
Figure 2 is a longitudinal diametrical section of my novel coupling per se.

I show in Figure 1 a portion of a wheel having on its rim 1 a conventional tire 2, and I also illustrate in said figure the application of my novel coupling in interposed relation between the end portions 3 and 4 of an anti-skid chain.

It is within the purview of my invention to form the different parts of my novel coupling of any material or materials consonant with the purposes of the said parts, and therefore it will be understood that specific materials do not enter into my invention.

As illustrated the coupling comprises a tubular body 5, closed at one end 6, and having at its opposite end a flared mouth 7 for an important purpose hereinafter set forth. The said body 5 is preferably, though not necessarily, made in two longitudinal sections, this for convenient and expeditious assembly, and it will also be noted that the end wall 6 is provided with an aperture 8, and that the two longitudinal opposed sections 9 are provided with diametrically disposed apertures 10 in coincidence with each other and adapted to receive a cottor pin 11.

The aperture 8 in one end of the coupling body is designed to receive the shank of an eye, 12, the inner end of the said shank being enlarged as designated by 13 to preclude disconnection of the eye from the body while permitting free swivel movement of either the body or the eye relative to each other.

Interiorly the coupling body is threaded for the engagement of a core 14, which by preference extends practically throughout the length of the body. The said core 14 is longitudinally slotted at 15 to receive the cotter pin 11, the function of which is to pervent casual movement of either the body or the core relative to each other; and it will also be noted that the core is provided in its rear end with a recess 16 to accommodate the enlargement 13, and is provided at its opposite end with a hook 17. The eye 12 and hook 17 are for the connection of the tire chain ends 3 and 4, and it will be readily apparent that when the bill 17× of the hook 17 is disposed in the flared mouth 7 of the body, the body will operate after the manner of a guard to absolutely preclude casual release of the link or tire chain end 4 from the hook 17.

It will be apparent from the foregoing that my improved coupling, particularly when constructed in the specific manner pointed out, will be susceptible of cheap production, and all of its parts will lend themselves to ready assembly, for holding the body sections together, and locking the body and the core each against shifting relative to the other so that there is no liability of the coupling permitting accidental loosening of the tire chain.

It will be further apparent from the foregoing that through the medium of my novel coupling, slack of the tire chain may be expeditiously and easily taken up without subjecting the tire chain to any appreciable amount of pressure strain. This is materially advantageous inasmuch as it avoids the imposition of unnecessary strain on the tire chain.

I have specifically described the preferred embodiment of my invention in order to impart a full, clear and exact understanding of the said embodiment. I do not desire, however, to be understood as confining myself to the construction and relative arrangement of the parts as disclosed, my invention being defined by my appended claims within the scope of which structural changes and modifications in relative arrangement may be made without departure from my invention.

Having described my invention, what I claim and desire to secure by Letters-Patent, is:—

1. A tire chain tightening coupling comprising a tubular body including two longitudinal halves and having an interior thread and a closed end with a longitudinal central aperture therein and also having a flared mouth at its opposite end, and intermediate, diametrical apertures in coincidence with each other, a connector having a shank turnable in the longitudinal central aperture of the body and also having an enlargement at the inner end of said shank, an exteriorly threaded and longitudinally slotted core disposed in the body and having a recess in its heel end and also having at its opposite end a hook, the bill of which is adapted to be disposed in and guarded by the said flared mouth of the body, and a cotter pin extending through the registered apertures of the body section and the longitudinal slot of the core, and serving the twofold function of connecting the body sections together and preventing casual shifting of either the body or the core with respect to the other.

2. A tire chain tightening coupling comprising a tubular body, interiorly threaded and having a flared mouth at one end, means for connecting the opposite end of the body with a tire chain end, a core threaded in the body and having at its outer end a hook the bill of which is adapted to be guarded in the flared mouth of the body, said core being longitudinally slotted, and a pin detachably secured in the body and core for permitting turning of the body when the pin is removed and for the prevention of such turning when the pin is engaged with the body and the core by extending through the slot of the latter.

3. A tire chain tightening coupling, comprising a tubular body interiorly threaded and open at one end, a connector complementary to the body at the other end thereof, a core threaded and adjustable longitudinally in the body and having at one end a hook guarded by the body, and means for preventing turning of either of the body or the core with respect to the other irrespective of the position of the core relative to the body.

4. A tire chain tightening coupling, comprising a tubular body interiorly threaded and open at one end, a connector complementary to the body at the other end thereof, a core threaded and adjustable longitudinally in the body and having at one end a hook, and means for preventing turning of either of the body or the core with respect to the other irrespective of the position of the core relative to the body; the said body having a flared mouth, and the said hook being arranged for the positioning of the end of its bill in said mouth and the guarding of the said end by the body.

In testimony whereof I affix my signature.

ARCHIE N. SMITH.